US008023264B2

(12) United States Patent
Shen et al.

(10) Patent No.: US 8,023,264 B2
(45) Date of Patent: Sep. 20, 2011

(54) BATTERY COVER LATCH MECHANISM AND PORTABLE ELECTRONIC DEVICE USING SAME

(75) Inventors: Zhi-Yun Shen, Shenzhen (CN); Si-Quan Chen, Shenzhen (CN); Zheng Shi, Shenzhen (CN); Chih-Chiang Chang, Taipei Hsien (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 587 days.

(21) Appl. No.: 12/254,096

(22) Filed: Oct. 20, 2008

(65) Prior Publication Data

US 2009/0280402 A1  Nov. 12, 2009

(30) Foreign Application Priority Data

May 9, 2008  (CN) .......................... 2008 1 0301521

(51) Int. Cl.
*G06F 1/16* (2006.01)
*H01M 2/10* (2006.01)
*H04M 1/00* (2006.01)

(52) U.S. Cl. ................. 361/679.58; 429/97; 455/575.1

(58) Field of Classification Search ............ 361/679.01–679.45, 679.55–679.59; 429/97, 100; 455/575.1, 455/575.8
See application file for complete search history.

(56) References Cited

U.S. PATENT DOCUMENTS

| | | | | |
|---|---|---|---|---|
| 5,607,792 | A * | 3/1997 | Garcia et al. ................... | 429/97 |
| 6,136,467 | A * | 10/2000 | Phelps et al. .................... | 429/97 |
| 6,623,049 | B2 * | 9/2003 | Shreeve et al. .................. | 292/19 |
| 6,625,425 | B1 * | 9/2003 | Hughes et al. ............... | 455/90.3 |
| 7,412,268 | B2 * | 8/2008 | Jung ......................... | 455/575.1 |
| 7,842,412 | B2 * | 11/2010 | Zhang et al. ..................... | 429/97 |
| 2006/0109610 | A1 * | 5/2006 | Liu et al. ....................... | 361/600 |
| 2006/0281501 | A1 * | 12/2006 | Zuo et al. .................... | 455/575.1 |
| 2006/0292439 | A1 * | 12/2006 | Zuo et al. ....................... | 429/97 |

* cited by examiner

Primary Examiner — Jayprakash N Gandhi
Assistant Examiner — Nidhi Desai
(74) Attorney, Agent, or Firm — Altis Law Group, Inc.

(57) ABSTRACT

A battery cover latch mechanism (10) used in portable electronic device (100) is described including a cover member (113), a housing member (111), a latch member (1137), a pressing member (15), and a releasing member (17). The latch member is used to latch the cover member to the housing member. The releasing member can be elastic deformed such that the pressing member moves and deforms the releasing member to release the cover member from the housing member.

13 Claims, 6 Drawing Sheets

BATTERY COVER LATCH MECHANISM AND PORTABLE ELECTRONIC DEVICE USING SAME

BACKGROUND

1. Field of the Invention

The invention relates to battery cover latch mechanisms used in portable electronic devices.

2. Description of Related Art

Portable electronic devices usually include latch mechanisms used to latch battery covers to housings. The latch mechanisms must tolerate frequent installation and removal of batteries relative to the housings.

A typical battery cover latch mechanism includes at least one spring to facilitate the operation thereof. However, the spring may easily wear out after repeated operation and, thus the battery cover latch mechanism may fail.

Therefore, there is room for improvement within the art.

BRIEF DESCRIPTION OF THE DRAWINGS

Many aspects of the exemplary battery cover latch mechanism and a portable electronic device using the battery cover latch mechanism can be better understood with reference to the following drawings. These drawings are not necessarily drawn to scale, the emphasis instead being placed upon clearly illustrating the principles of the exemplary battery cover latch mechanism and the portable electronic device. Moreover, in the drawings like reference numerals designate corresponding parts throughout the several views. Wherever possible, the same reference numbers are used throughout the drawings to refer to the same or like elements of an embodiment.

DETAILED DESCRIPTION OF THE EXEMPLARY EMBODIMENTS

Figure 1:
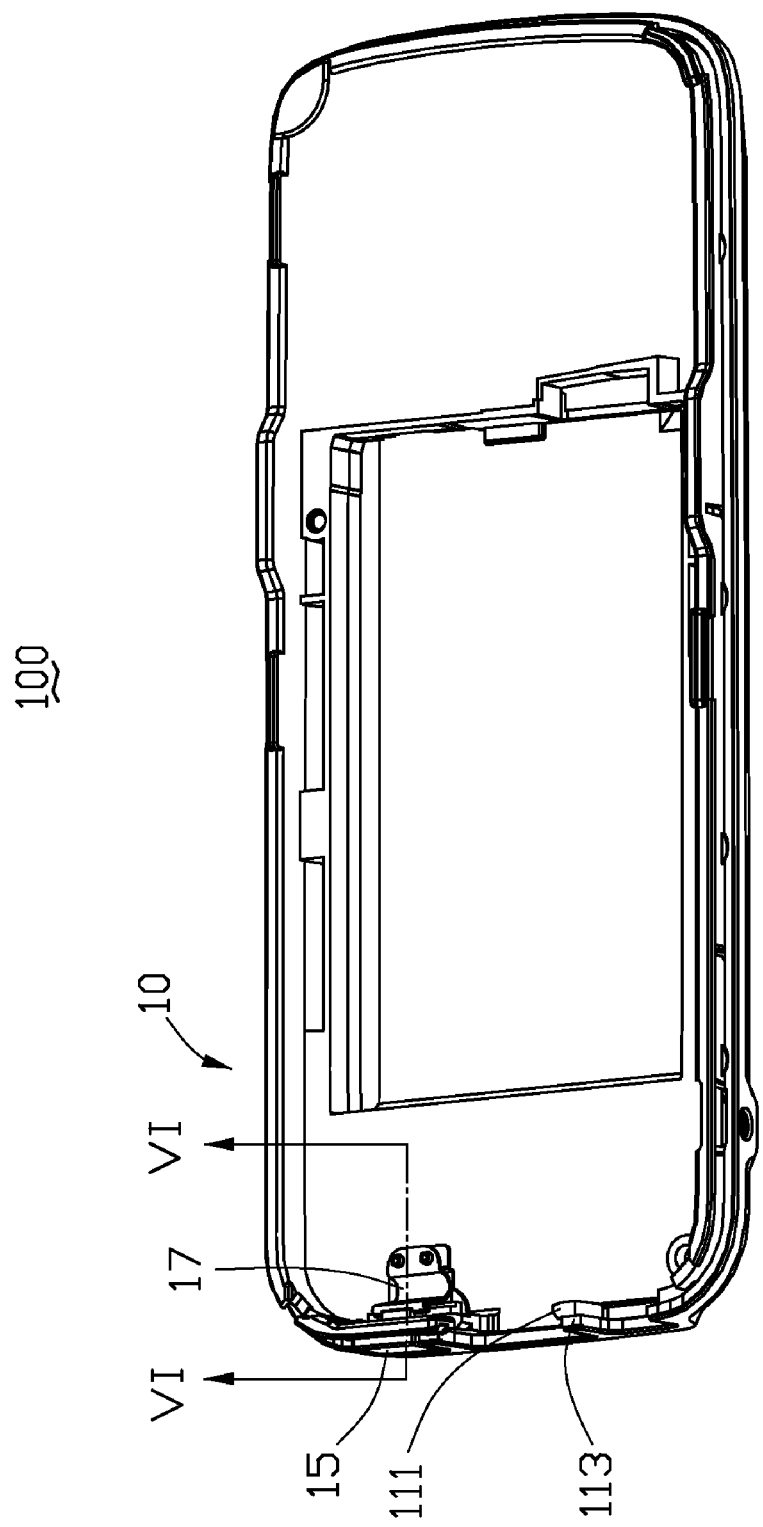
FIG. 1 is an isometric, exploded view of a portable electronic device incorporating a battery cover latch mechanism according to the exemplary embodiment.
Figure 2:
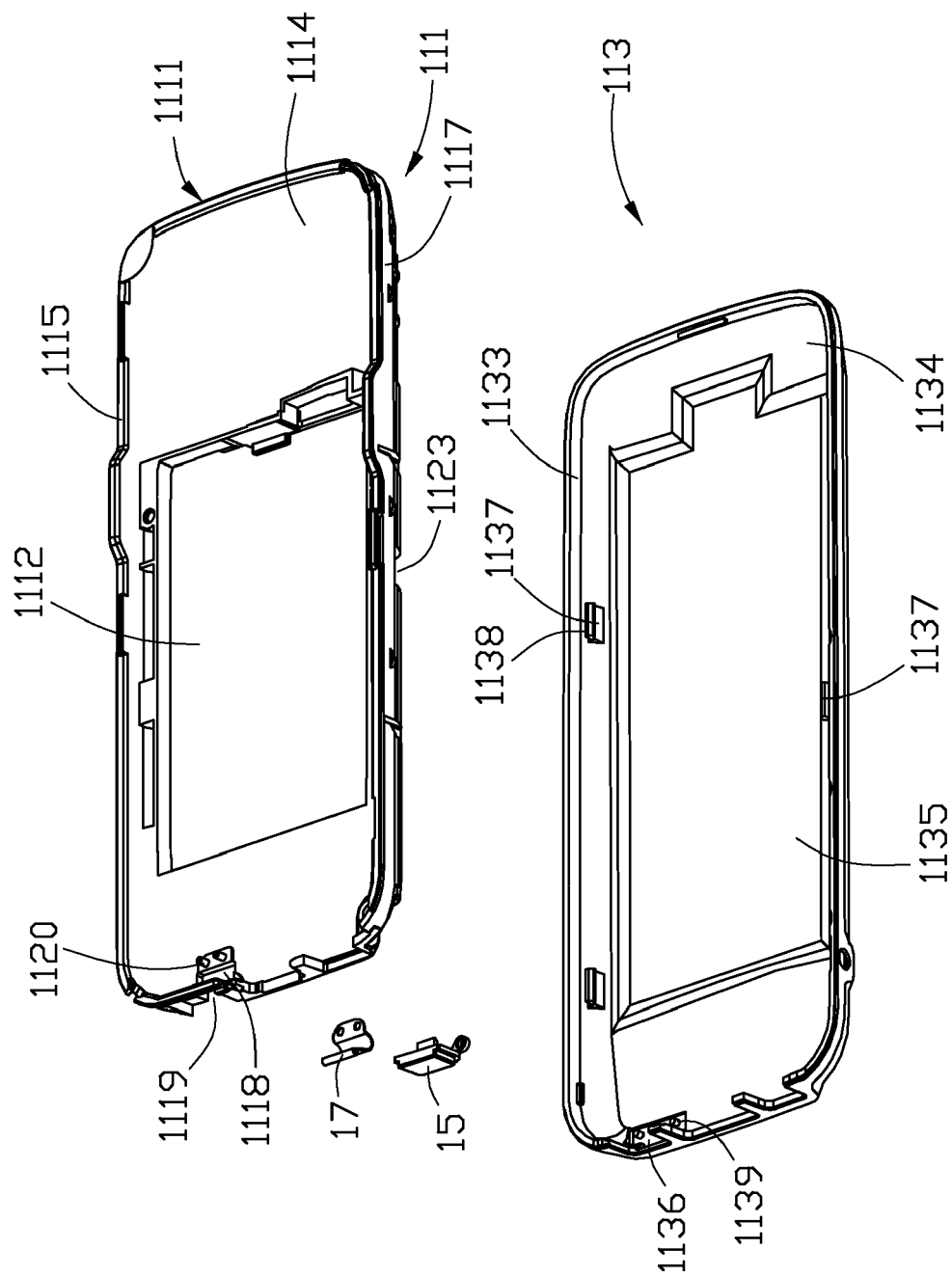
FIG. 2 is an isometric, exploded view of the battery cover latch mechanism shown in FIG. 1.

FIGS. 1 and 2 show a portable electronic device 100 including the battery cover latch mechanism 10, a housing member 111, a cover member 113, a pressing member 15, a releasing member 17, and three latch members 1137. The housing member 111 can be a housing of the portable electronic device 100. The cover member 113 can be a cover of the portable electronic device 100. The cover member 113 latches to the housing member 111 using the three latch members 1137. The pressing member 15 and the releasing member 17 are configured to be mounted between the housing member 111 and the cover member 113 and release the cover member 113 from the housing member 111.

The cover member 113 has a first peripheral wall 1133, a bottom wall 1134, and a battery chamber 1135. The first peripheral wall 1133 surrounds the battery chamber 1135. The battery chamber 115 is defined in the bottom wall 1134 and can accommodate a battery (not shown). One end of first peripheral wall 1133 defines a generally rectangular first notch 1136. The first peripheral wall 1133 also forms the three latch members 1137. The three latch members 1137 are generally L-shaped blocks, each having a wedge-shaped latch portion 1138 at a distal end relative to the first peripheral wall 1133. The bottom wall 1134 has two mounting columns 1139 formed thereon and near the first notch 1136.

Figure 3:
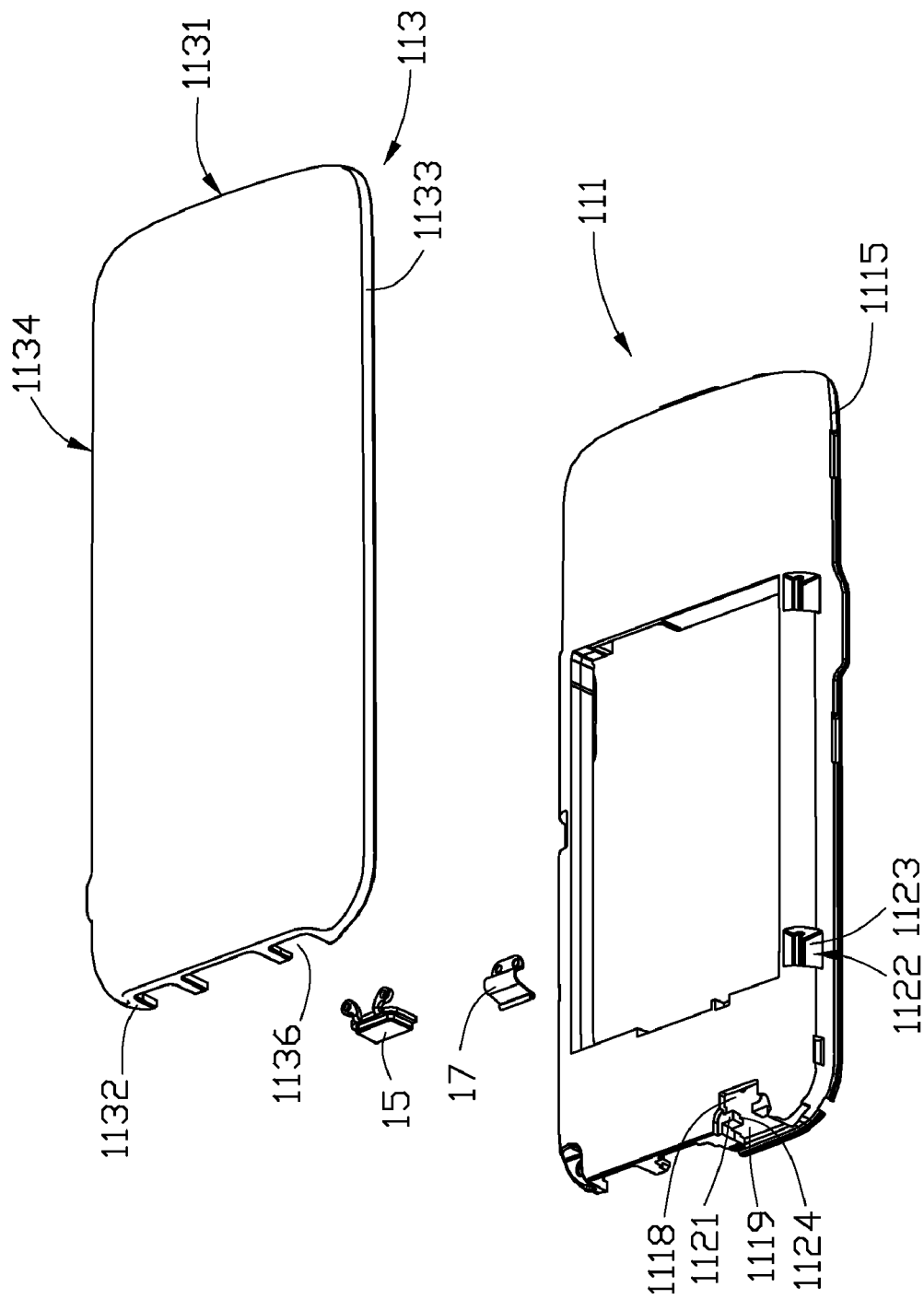
FIG. 3 is similar to FIG. 2, but viewed from another angle.

Referring to FIG. 3 the housing member 111 includes a second peripheral wall 1115, and an upper wall 1114. The second peripheral wall 1115 is configured to mate with the first peripheral wall 1133 (best shown in FIG. 1). One end of the second peripheral wall 1115 defines a generally rectangular second notch 1119 corresponding to the first notch 1136. The upper wall 1114 defines a cavity 1118. The cavity 1118 is adjacent to the second peripheral wall 1115 and communicates with the second notch 1119. Correspondingly, two step-shaped resist blocks 1121, each having a first step part 1124 formed on an upper wall 1114 and between the second notch 1119 and the cavity 1118.

The upper wall 1114 forms two attaching columns 1120. The two attaching columns 1120 are located near the cavity 1118 and opposite to the second notch 1119. Two opposite ends of the second peripheral wall 1115 define three latch grooves 1122 corresponding to the three latch members 1137. Each latch groove 1122 has a wedge-shaped latch slit 1123 corresponding to a latch portion 1138. Thus, the latch portions 1138 can be latched in the latch slits 1123 and the latch members 1137 can be latched in the latch grooves 1122.

Figure 4:
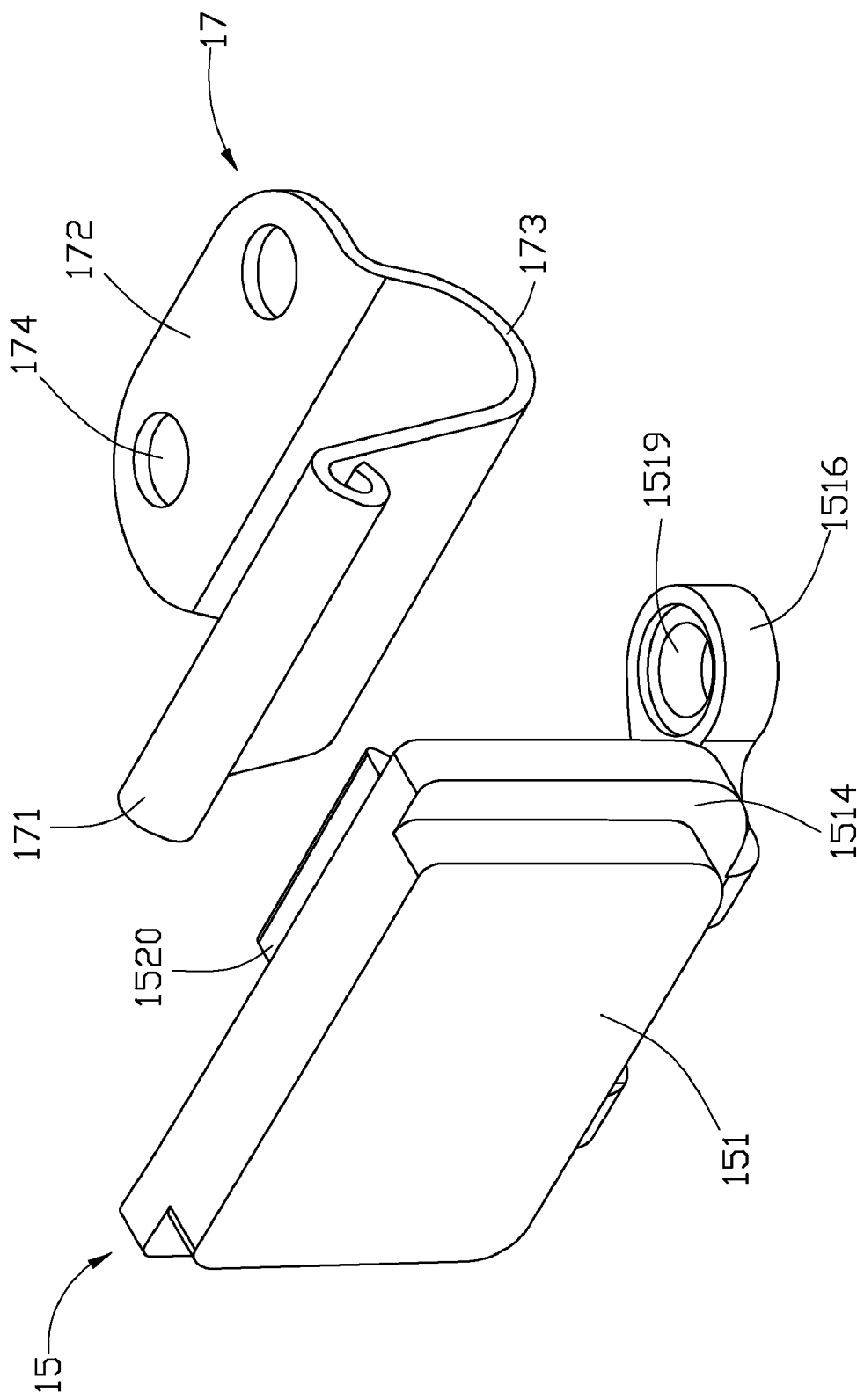
FIG. 4 is an isometric view of a pressing member and a releasing member of the battery cover latch mechanism shown in FIG. 2.
Figure 5:
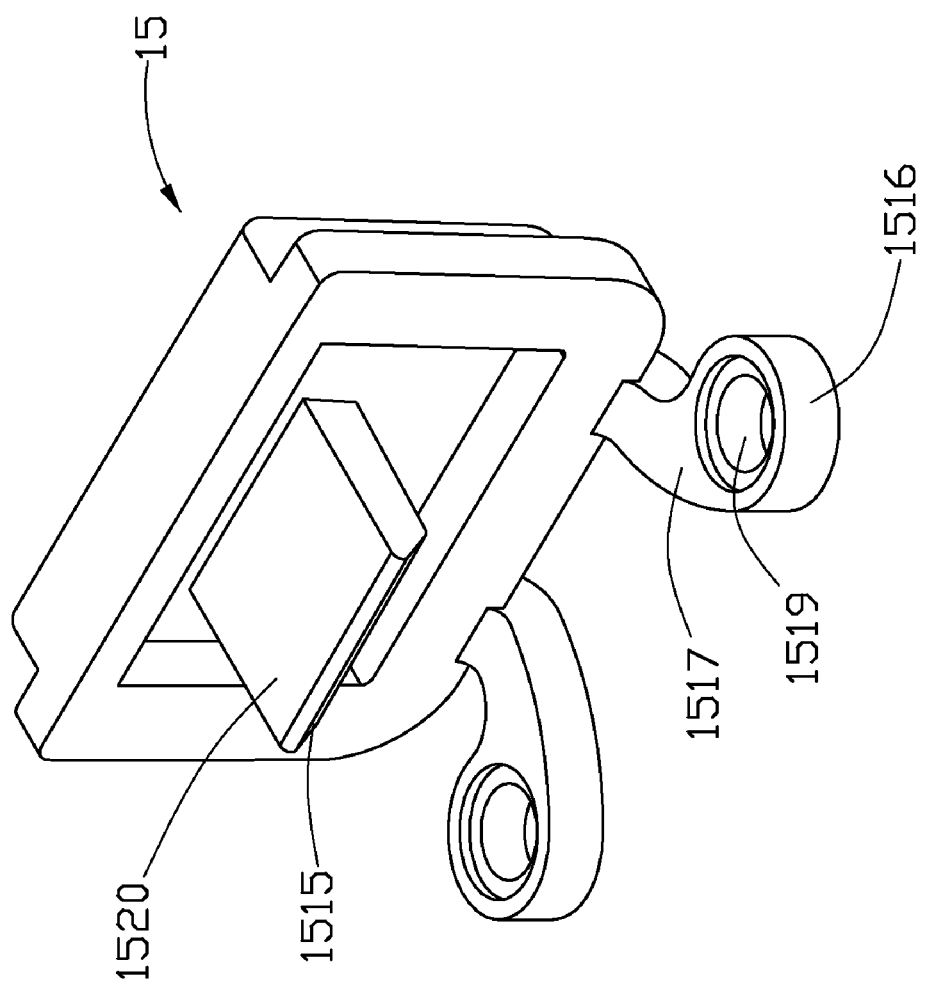
FIG. 5 is an isometric view of the pressing member shown in FIG. 4, showing another aspect of it.

Referring to FIGS. 4 and 5, the pressing member 15 includes a generally stepped pressing portion 151, two elastic ring portions 1516, and an engage portion 1520. The two elastic ring portions 1516 and the engage portion 1520 protrude from the same side of the pressing portion 151. The engage portion 1520 is positioned between the elastic ring portions 1516.

The press portion 151 is configured to be received in the first notch 1136 and slide within the first notch 1136. The press portion 151 has two second step parts 1514 to resist against the interior surface of the first peripheral wall 1133, thus preventing the pressing member 15 from falling out of the first notch 1136. The two ring portions 1516 include two securing portions 1516 and two connecting portions 1517. The connecting portions 1517 connect the ring portions 1516 to the press portion 151. The two securing portions 1516 define two first securing holes 1519. The pressing member 15 further can be secured within the first notch 1136 by securing (e.g., hot melting) the mounting columns 1139 within the first securing holes 1519. The engage portion 1520 has an inclined wall 1515 at a distal end to the press portion 151.

The releasing member 17 is a curved sheet including a looped engage section 171, an attaching section 172, and a release section 173. The attaching section 172 defines two attaching holes 174 corresponding to the two attaching columns 1120. The attaching section 172 can be securely attached to the upper wall 1114 by e.g., a hot melting of the attaching columns 1120 within the attaching holes 174. The release section 173 is generally U-shaped and can be elastically deformed.

Figure 6:
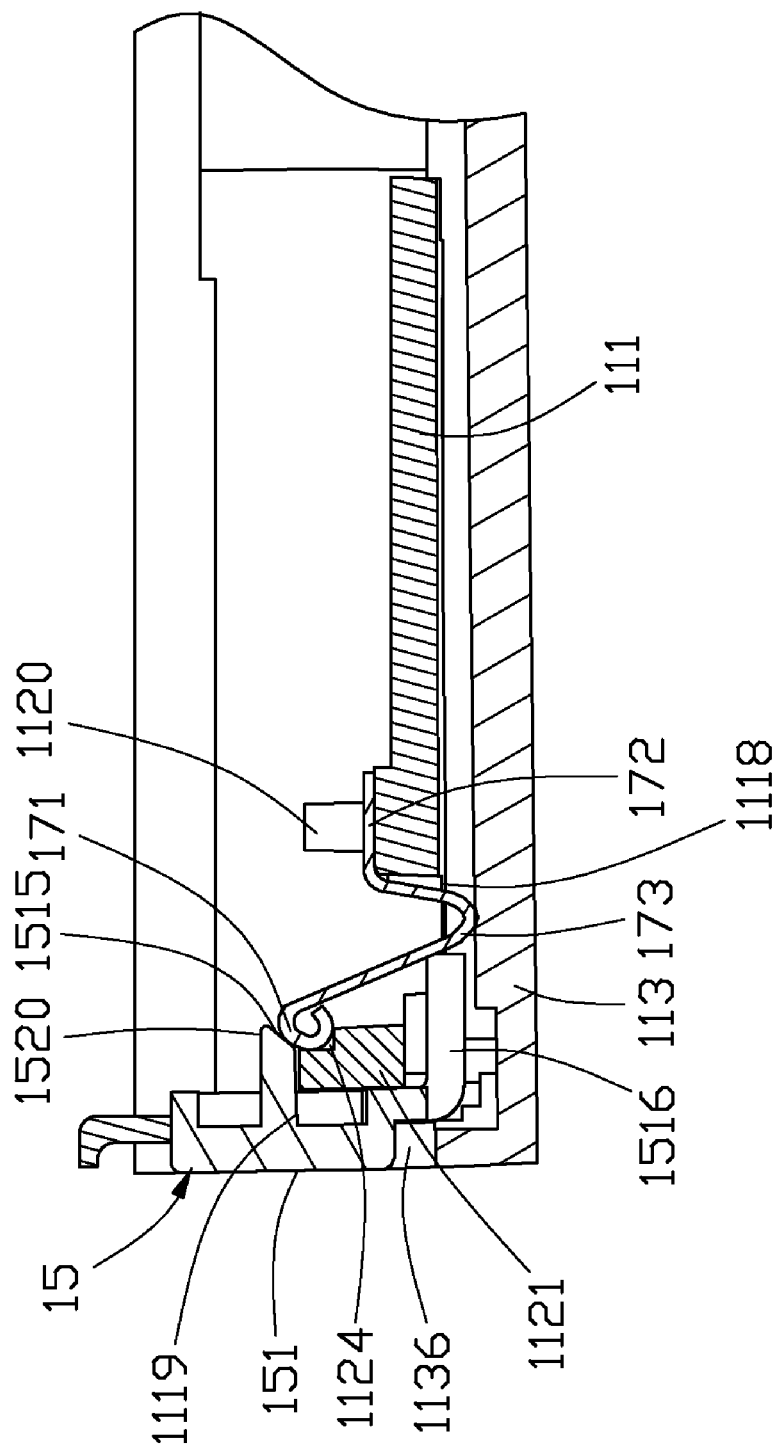
FIG. 6 is a sectional view of the battery cover latch mechanism shown in FIG. 1 in a latched position.

Referring to FIG. 6, the battery cover latch mechanism 10 is in a latched position. The cover member 113 is latched to the housing member 111 by the latching of the latch members 1137 in the latch grooves 1122. The latch portions 1138 are latched in the latch slits 1123. The second notch 1119 aligns and communicates with the first notch 1136. The releasing member 17 is positioned between the housing member 111 and the cover member 113. The attaching section 172 is securely attached to the housing member 111. The release section 173 is elastically deformed and has a part passing through the cavity 1118 of the housing member 111 to bias against the cover member 113. Accordingly, the engage section 171 biases against the inclined wall 1515 and the first step parts 1124. The biasing of the engage section 171 makes the pressing member 15 away from the first notch 1136. Oppositely, the pressing member 15 is secured within the first notch 1136 by the biasing of the interior surface of the first peripheral wall 1133 against the second step parts 1514.

When the cover member 113 needs to be released from the housing member 111, the press portion 151 is pressed further into the first notch 1136. During this stage, the inclined wall 1515 urges the engage section 171 away from the first step parts 1124 and deforms the release section 173. The release section 173 further passes through the cavity 1118 to further bias against the cover member 113, thereby increasing the resisting force between them. There also exists a latching force between the latch portions 1138 and the latch slits 1123. When the resisting force exceeds the latching force, the latching of the latch portions 1138 in the latch slits 1123 is released. At this time, the cover member 113 can be released from the housing member 111.

The latching can be achieved by simply pressing the cover member 113 to the housing member 111. During this stage, the latch portions 1138 engages into the latch slits 1123, thereby latching the latch members 1137 in the latch grooves 1122.

It is to be understood, however, that even through numerous characteristics and advantages of the exemplary invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A battery cover latch mechanism, comprising: a cover member; a housing member; a latch member configured for latching the cover member to the housing member; a pressing member; and a releasing member being elastically deformed and configured such that the pressing member moves and deforms the releasing member to release the cover member from the housing member; wherein the releasing member is a curved sheet comprising a releasing section, the releasing section configured for being elastically deformed to release the cover member from the housing member; wherein: when the cover member is latched to the housing member, a latching force is produced between the cover member and the housing member; and the releasing section biases against the cover member during the releasing of the cover member relative to the housing member, a releasing force is produced between the cover member and the housing member to overcome the latching force; wherein the latch member is formed on one of the cover member and the housing member, and the releasing member is securely attached to the other of the cover member and the housing member; wherein the housing member defines a cavity therethrough, and the release section is configured for partially passing through the cavity to resist against the cover member; and wherein the pressing member is securely attached to the cover member, comprising a press portion and an engage portion, the press portion and the engage portion configured for sliding relative to the cover member.

2. The battery cover latch mechanism as claimed in claim 1, wherein the releasing member further comprises an engage section connecting the release section, and the pressing member comprises an engage portion, the engage portion engaging with the engage section such that when the engage portion moves, the engage section moves to deform the release section.

3. The battery cover latch mechanism as claimed in claim 2, wherein the engage section is looped and the engage portion comprising an inclined wall resisting against the engage section.

4. The battery cover latch mechanism as claimed in claim 2, wherein the releasing member further comprises an attaching section connecting the release section, the release section positioned between the attaching section and the engage section, the attaching section securely attached to the housing member.

5. The battery cover latch mechanism as claimed in claim 4, wherein the housing member comprise an attaching column, the attaching section defines an attaching hole, the attaching column securely attached within the attaching hole.

6. The battery cover latch mechanism as claimed in claim 1, wherein the pressing member further comprises an elastic ring portion securely attached to the cover member.

7. The battery cover latch mechanism as claimed in claim 6, wherein the ring portion comprise a securing hole, the cover member comprises a securing column, the securing column securely attached within the securing hole.

8. The battery cover latch mechanism as claimed in claim 1, wherein the housing member defines a latch groove, the latch member latched to the latch groove.

9. The battery cover latch mechanism as claimed in claim 8, wherein the latch groove comprises a wedge-shaped latch slit, the latch member comprises a wedge-shaped latch portion, the latch portion latched in the latch slit.

10. A portable electronic device, comprising: a cover; a housing; a battery cover latch mechanism, comprising: a latch member configured for latching the cover to the housing; a pressing member; and a releasing member being elastically deformed and configured such that the pressing member moves and deforms the releasing member to release the cover from the housing; wherein the releasing member is a curved sheet comprising a releasing section, the releasing section configured for being elastically deformed to release the cover from the housing; wherein: when the cover is latched to the housing, a latching force is produced between the cover and the housing; and the releasing section biases against the cover during the releasing of the cover relative to the housing, a releasing force is produced between the cover and the housing to overcome the latching force; wherein the latch member is formed on one of the cover and the housing, and the releasing member is securely attached to the other of the cover and the housing; wherein the housing defines a cavity therethrough, and the release section is configured for partially passing through the cavity to resist against the cover; and wherein the pressing member comprises a press portion and an engage portion, and an elastic ring portion secured to the cover, the press portion and the engage portion configured for sliding relative to the cover.

11. The portable electronic device as claimed in claim 10, wherein the releasing member further comprises an engage section connecting the release section, and the pressing member comprises an engage portion, the engage portion engaging with the engage section such that when the engage portion moves, the engage section moves to deform the release section.

12. The portable electronic device as claimed in claim 11, wherein the releasing member further comprises an attaching section connecting the release section, the release section positioned between the attaching section and the engage section, the attaching section secured to the housing.

13. The portable electronic device as claimed in claim 11, wherein the housing defines a latch groove, the latch member latched to the latch groove.

* * * * *